(12) United States Patent
Jiang et al.

(10) Patent No.: US 11,174,974 B1
(45) Date of Patent: Nov. 16, 2021

(54) UNIVERSAL QUICK CONNECTOR

(71) Applicant: Ningbo Sinppa Technology Co., Ltd., Zhejiang (CN)

(72) Inventors: Changguo Jiang, Ningbo (CN); Shifang Xu, Ningbo (CN)

(73) Assignee: NINGBO SINPPA TECHNOLOGY CO., LTD.

( * ) Notice: Subject to any disclaimer, the term of this patent is extended or adjusted under 35 U.S.C. 154(b) by 0 days.

(21) Appl. No.: 17/029,717

(22) Filed: Sep. 23, 2020

(51) Int. Cl.
*F16L 37/23* (2006.01)
*F16L 37/40* (2006.01)

(52) U.S. Cl.
CPC ............... *F16L 37/23* (2013.01); *F16L 37/40* (2013.01)

(58) Field of Classification Search
CPC .................................. F16L 37/23; F16L 37/40
USPC ....................................................... 251/149.6
See application file for complete search history.

(56) References Cited

U.S. PATENT DOCUMENTS

| 8,632,052 B2* | 1/2014 | Liu | F16L 37/23 |
| | | | 251/149.9 |
| 8,641,013 B2* | 2/2014 | Liu | F16L 37/42 |
| | | | 251/149.9 |
| 2013/0037733 A1* | 2/2013 | Liu | F16L 37/42 |
| | | | 251/149.6 |
| 2018/0356019 A1* | 12/2018 | Xu | F16K 27/067 |

FOREIGN PATENT DOCUMENTS

| CN | 201521014821.7 | 5/2015 |
| CN | 201521014896.5 | 5/2015 |
| CN | 201521018068.9 | 5/2015 |

* cited by examiner

*Primary Examiner* — Kevin L Lee

(57) ABSTRACT

A universal quick connector comprising a bolt body, a connector hub, a hub outer sleeve and a connector valve core. Rear end of the connector hub is in threaded connection with front end of the bolt body, and the connector valve core is movably arranged in the connector hub. Inner wall of front end of the connector valve core is provided with a first and a second annular grooves. A first and a second sealing rings are embedded in the first and second annular grooves. Front end and rear end of the first annular groove is provided with a first and a second annular step surface. The first and second annular step surfaces extend to sidewall of the first annular groove. An annular step is formed at rear end of the second annular step surface. The present disclosure has a simple structure and may be quickly connected with various plugs.

9 Claims, 3 Drawing Sheets

UNIVERSAL QUICK CONNECTOR

TECHNICAL FIELD

This disclosure generally relates to the technical field of quick connectors for pipeline connection, and more particularly, to a universal quick connector.

BACKGROUND

A quick connector is a connector for quickly connecting pipelines, which is internally provided with a plurality of steel balls and may be fixedly engaged with an external plug core. The quick connector guarantees the airtightness of the pipeline connection while achieving a quick connection. There are various quick connectors sold on the market, such as a pneumatic quick connector disclosed in Chinese patent 201521018068.9, an easy-to-assemble quick connector disclosed in Chinese patent 201521014821.7, and a quick connector disclosed in Chinese patent 201521014896.5.

Presently, conventional quick connectors are normally designed to match a type of plug. However, various sizes of pipelines result in various models and sizes of plugs. Taking American standard plugs as examples, in the prior art, there are five types of American standard plugs sold on the market, which respectively are: no. 3 plug—industrial (Milton) plug, no. 5 plug—automotive type plug, no. 6 plug—ARO type plug, no. 17 plug—Lincoln design plug and no. 19 plug—high flow plug. The aforesaid five plugs have different sizes. During pipeline connection, when the quick connectors on different pipelines do not match the plugs, to complete the connection operation, the quick connectors and/or the plugs need to be replaced. As a result, the complicated operation brings great inconvenience to operators.

SUMMARY

The purpose of the present disclosure is to provide a universal quick connector, which has a simple structure, may be quickly connected with various plugs and achieves high flexibility and installation efficiency.

To achieve the above purpose, the present disclosure adopts the following technical solution: a universal quick connector comprising a bolt body, a connector hub, a hub outer sleeve and a connector valve core, wherein the rear end of the connector hub is in threaded connection with the front end of the bolt body, a plurality of ball grooves are uniformly distributed in the sidewall of the front end of the connector hub along the circumferential direction, and steel balls are arranged in the ball grooves, wherein the hub outer sleeve is movably sleeved outside the connector hub, and the inner wall of the front end of the hub outer sleeve abuts against the steel balls, wherein an outer sleeve spring is abutted between the hub outer sleeve and the bolt body, and the connector valve core is configured to be a hollow structure with an open front end and a closed rear end, wherein the connector valve core is movably arranged in the connector hub, and the inner wall of the bolt body is provided with a guiding sleeve in sealing fit with the connector valve core, wherein a valve core outer spring is abutted between the front end of the connector valve core and the guiding sleeve, and the sidewall of the rear end of the connector valve core is provided with an exhaust port, wherein the inner wall of the front end of the connector valve core is sequentially provided with a first annular groove and a second annular groove from front to back, wherein a first sealing ring is embedded in the first annular groove, a second sealing ring is embedded in the second annular groove, and the inner diameter of the first sealing ring is larger than the inner diameter of the second sealing ring, wherein the front end of the first annular groove is provided with a first annular step surface, and the rear end of the first annular groove is provided with a second annular step surface, wherein the rear end of the first annular step surface extends to the sidewall of the first annular groove, and the front end of the second annular step surface extends to the sidewall of the first annular groove, wherein the diameter of the first annular step surface is greater than the diameter of the second annular step surface, and an annular step is formed at the rear end of the second annular step surface.

In another aspect of the present disclosure, the interior of the rear end of the connector valve core is provided with a valve core inner spring.

In another aspect of the present disclosure, the guiding sleeve is axially abutted between the bolt body and the connector hub.

In another aspect of the present disclosure, the inner wall of the front end of the guiding sleeve is embedded with a guiding sleeve sealing ring, which is in sealing fit with the outer wall of the connector valve core.

In another aspect of the present disclosure, a valve core sealing ring in sealing fit with the inner wall of the guiding sleeve is embedded in the outer wall of the rear end of the connector valve core.

In another aspect of the present disclosure, a bolt sealing ring is arranged between the guiding sleeve and the bolt body.

In another aspect of the present disclosure, the front end of the connector valve core is provided with an annular extension portion which abuts against the steel balls, and the inner diameter of the annular extension portion is greater than or equal to the diameter of the first annular step surface.

In another aspect of the present disclosure, the inner wall of the front end of the hub outer sleeve is sequentially provided with an outer sleeve cylindrical surface section and an outer sleeve conical surface section, which are matched with the steel balls from front to back. The rear end of the outer sleeve cylindrical surface section is connected to the front end of the outer sleeve conical surface section.

In another aspect of the present disclosure, the outer wall of the front end of the connector hub is provided with a stopping portion in stopping fit with the hub outer sleeve.

In another aspect of the present disclosure, the front end of the first sealing ring is axially provided with an annular extension part, and the annular extension part is sleeved inside the first annular step surface. The outer diameter of the annular extension part matches the diameter of the first annular step surface, and the inner diameter of the annular extension part is equal to the inner diameter of the first sealing ring.

Compared with the prior art, the present disclosure has the following advantages: the connector valve core of the universal quick connector of the present disclosure has an improved structure. More specifically, the first sealing ring and the second sealing ring are respectively embedded in the connector valve core, and the first annular step surface and the second annular step surface with different diameters are arranged in the connector valve core. In this way, when in use, the quick connector may be quickly connected with different plugs in an insertion mode such that an ideal sealing effect is realized. The present disclosure has a simple structure, may be flexibly used and achieves high installation efficiency.

BRIEF DESCRIPTION OF THE DRAWINGS

In FIGS. 1-7: 1—Bolt Body, 11—Bolt Sealing Ring, 2—Connector Hub, 21—Ball Grooves, 22—Stopping Portion, 3—Hub Outer Sleeve, 31—Outer Sleeve Cylindrical Surface Section, 32—Outer Sleeve Conical Surface Section, 4—Connector Valve Core, 41—Annular Extension Portion, 42—Exhaust Port, 43—First Annular Groove, 431—First Sealing Ring, 4311—Annular Extension Part, 44—Second Annular Groove, 441—Second Sealing Ring, 45—First Annular Step Surface, 46—Second Annular Step Surface, 47—Annular Step, 48—Valve Core Sealing Ring, 5—Steel Balls, 6—Outer Sleeve Spring, 7—Guiding Sleeve, 71—Guiding Sleeve Sealing Ring, 8—Valve Core Outer Spring, 9—Valve Core Inner Spring, 101—Columnar Insertion Section, 102—Flat Ring, 103—Clamping Groove.

DETAILED DESCRIPTION

Figures and detailed embodiments are combined hereinafter to further elaborate the technical solution of the present disclosure.

Embodiment 1

Figure 1:
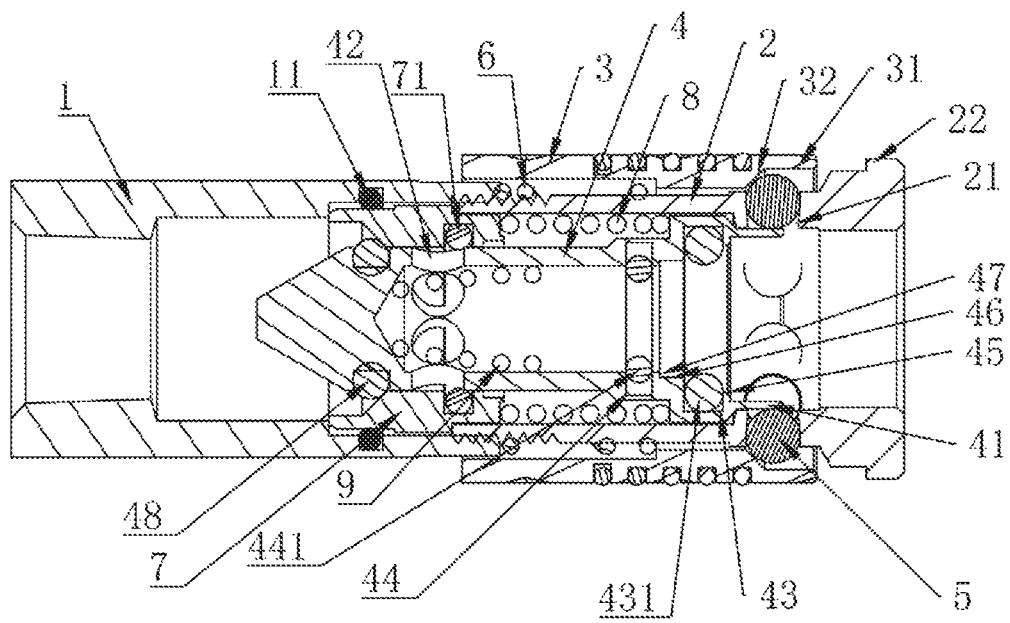
FIG. 1 is a conceptual diagram illustrating an overall assembly structure of embodiment 1 of the present disclosure.

As shown in FIG. 1, the universal quick connector of the present disclosure comprises a bolt body 1, a connector hub 2, a hub outer sleeve 3 and a connector valve core 4. The rear end of the connector hub 2 is in threaded connection with the front end of the bolt body 1, a plurality of ball grooves 21 are uniformly distributed in the sidewall of the front end of the connector hub 2 along the circumferential direction, and steel balls 5 are arranged in the ball grooves 21. The hub outer sleeve 3 is movably sleeved outside the connector hub 2, and the outer wall of the front end of the connector hub 2 is provided with a stopping portion 22 in stopping fit with the hub outer sleeve 3. The inner wall of the front end of the hub outer sleeve 3 abuts against the steel balls 5. More specifically, the inner wall of the front end of the hub outer sleeve 3 is sequentially provided with an outer sleeve cylindrical surface section 31 and an outer sleeve conical surface section 32, which are matched with the steel balls 5 from front to back. The rear end of the outer sleeve cylindrical surface section 31 is connected to the front end of the outer sleeve conical surface section 32, and the front end of the connector valve core 4 is provided with an annular extension portion 41, which abuts against the steel balls 5. An outer sleeve spring 6 is abutted between the hub outer sleeve 3 and the bolt body 1, and the connector valve core 4 is configured to be a hollow structure with an open front end and a closed rear end. The connector valve core 4 is movably arranged in the connector hub 2, and the inner wall of the bolt body 1 is provided with a guiding sleeve 7 in sealing fit with the connector valve core 4. A valve core outer spring 8 is abutted between the front end of the connector valve core 4 and the guiding sleeve 7, and the sidewall of the rear end of the connector valve core 4 is provided with an exhaust port 42.

The aforesaid is the main structure of the universal quick connector of the present disclosure. As the operating principle of the present disclosure is the same as that of conventional quick connectors, it is briefly described herein. For details, the quick connector disclosed in Chinese patent 201521014896.5 may be referred.

As an improvement of the present disclosure, the inner wall of the front end of the connector valve core 4 is sequentially provided with a first annular groove 43 and a second annular groove 44 from front to back. A first sealing ring 431 is embedded in a first annular groove 43, a second sealing ring 441 is embedded in the second annular groove 44, and the inner diameter of the first sealing ring 431 is larger than the inner diameter of the second sealing ring 441. The front end of the first annular groove 43 is provided with a first annular step surface 45, and the rear end of the first annular groove 43 is provided with a second annular step surface 46. The rear end of the first annular step surface 45 extends to the sidewall of the first annular groove 43, and the front end of the second annular step surface 46 extends to the sidewall of the first annular groove 43. The diameter of the first annular step surface 45 is greater than the diameter of the second annular step surface 46, and an annular step 47 is formed at the rear end of the second annular step surface 46. In this embodiment, to achieve a quick connection with the plug, the inner diameter of the annular extension portion 41 is greater than or equal to the diameter of the first annular step surface 45.

The connector valve core 4 of the universal quick connector of the present disclosure has an improved structure. More specifically, the first sealing ring 431 and the second sealing ring 441 are respectively embedded in the connector valve core 4, and the first annular step surface 45 and the second annular step surface 46 with different diameters are arranged in the connector valve core 4. In this way, when in use, the quick connector may be quickly connected with different plugs in an insertion mode such that an ideal sealing effect is realized. The present disclosure has a simple structure, may be flexibly used and achieves high installation efficiency.

To allow those skilled in the art to understand the structural features and effects of the present disclosure, five types of American standard plugs are taken as examples to further describe the present disclosure.

FIGS. 3-7 show the structures of the five types of American standard plugs (namely, no. 3 plug, no. 5 plug, no. 6 plug, no. 17 plug and no. 19 plug). As shown in FIGS. 3-7, the main structures of the five types of plugs are basically the same, wherein an insertion end of each plug is provided with a columnar insertion section 101 and a clamping groove 103, and a flat ring 102 is formed between the columnar insertion section 101 and the clamping groove 103. What makes the aforesaid plugs different is that the dimensions of the insertion ends are different. More specifically, the axial length of the columnar insertion section 101 and the diameter of the flat ring 102 are different. For instance, the outer diameter of the columnar insertion section 101 of no. 3, no. 6 and no. 19 plugs are relatively large. The outer diameter of the columnar insertion section 101 of no. 17 plug is relatively small but the axial length of the columnar insertion section 101 of no. 17 plug is relatively long. When connecting no. 3 or no. 6 plug with the quick connector, the columnar insertion section 101 of the plug is inserted into the connector valve core 4, and the end portion of the columnar insertion section 101 abuts against the annular step 47, thereby pushing the connector valve core 4 to move backwards relative to the connector hub 2. Thus, the steel balls 5 are clamped into the clamping groove 103 of the plug. In the aforesaid two assembled states, the connector valve core 4 is in sealing contact with the outer wall of the columnar insertion section 101 of no. 3 or no. 6 plug through the inner wall of the first sealing ring 431. In this way, an ideal sealing connection effect is achieved.

When connecting no. 5 or no. 19 plug with the quick connector of the present disclosure, the end portion of the columnar insertion section 101 abuts against the front-end surface of the first sealing ring 431, thereby pushing the connector valve core 4 to move backwards relative to the connector hub 2. Thus, the steel balls 5 are clamped into the clamping groove 103 of the plug. In the aforesaid two assembled states, the connector valve core 4 is in sealing contact with end surface of no. 5 or no. 19 plug through the front-end surface of the first sealing ring 431. In this way, an ideal sealing connection effect is achieved.

When connecting no. 17 plug with the quick connector of the present disclosure, the end portion of the columnar insertion section 101 of the plug penetrates through the second sealing ring 441 and extends into the rear end of the connector valve core 4, thereby pushing the connector valve core 4 to move backwards relative to the connector hub 2. Thus, the steel balls 5 are clamped into the clamping groove 103 of the plug, and the connector valve core 4 is in sealing contact with the outer wall of the columnar insertion section 101 of no. 17 plug through the inner wall of the second sealing ring 441. In this way, an ideal sealing connection effect is achieved.

It should be noted that, in this embodiment, the five types of American standard plugs are taken as examples to describe the present disclosure, and thus the specific sizes of the first sealing ring 431, the second sealing ring 441, the first annular step surface 45, the second annular step surface 46 and the annular step 47 are matched with the corresponding sizes of the aforesaid five types of American standard plugs.

Preferably, the interior of the rear end of the connector valve core 4 is provided with a valve core inner spring 9. For plugs with a comparatively thin-long columnar insertion section 101 (e.g., no. 17 American standard plug), when the plug and the connector valve core 4 are connected in an insertion mode, the elastic effect of the valve core inner spring 9 is utilized to ensure that the plug does not loosen. To prevent the valve core inner spring 9 from shaking in the connector valve core 4, during assembly, the valve core inner spring 9 may be installed into the connector valve core 4 in an appropriate interference manner. Thus, when the valve core inner spring 9 is not compressed by the plug, by means of the interference acting force of the inner wall of the connector valve core 4, the spring may be prevented from shaking, and when the plug abuts against the valve core inner spring 9, the valve core inner spring 9 may play a role in preventing the plug from loosening.

Preferably, the guiding sleeve 7 is axially abutted between the bolt body 1 and the connector hub 2. In other words, the guiding sleeve 7 of the present disclosure is detachable relative to the bolt body 1 and the connector valve core 4. Through adopting the aforesaid design, the installation is convenient, the processing is simple and the concentricity of the product is ensured.

Further, to improve the internal sealing performance of the present disclosure, the inner wall of the front end of the guiding sleeve 7 is embedded with a guiding sleeve sealing ring 71, which is in sealing fit with the outer wall of the connector valve core 4. A valve core sealing ring 48 in sealing fit with the inner wall of the guiding sleeve 7 is embedded in the outer wall of the rear end of the connector valve core 4, and a bolt sealing ring 11 is arranged between the guiding sleeve 7 and the bolt body 1.

Embodiment 2

Figure 2:
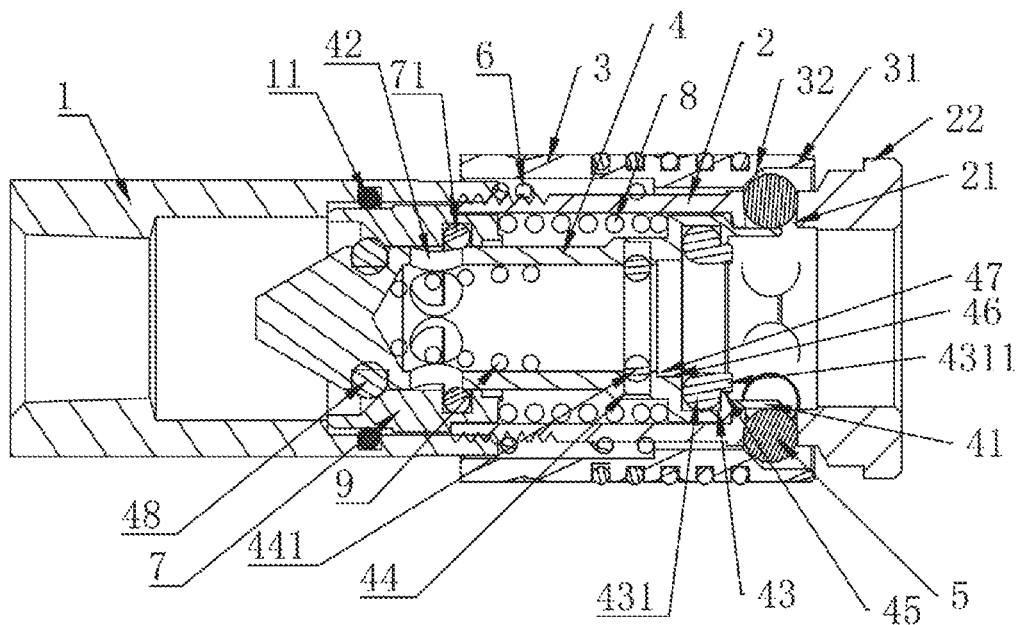
FIG. 2 is a conceptual diagram illustrating an overall assembly structure of embodiment 2 of the present disclosure.
Figure 3:
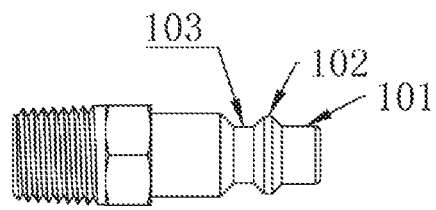
FIG. 3 is a conceptual diagram illustrating a structure of no. 3 American standard plug.
Figure 4:
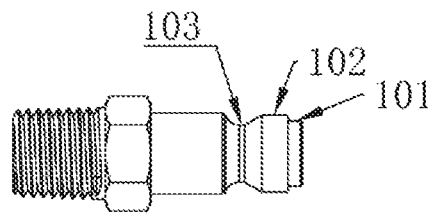
FIG. 4 is a conceptual diagram illustrating a structure of no. 5 American standard plug.
Figure 5:
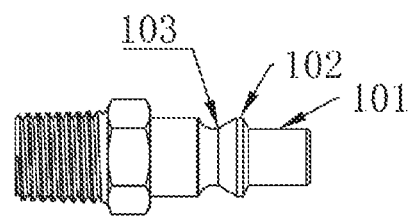
FIG. 5 is a conceptual diagram illustrating a structure of no. 6 American standard plug.
Figure 6:
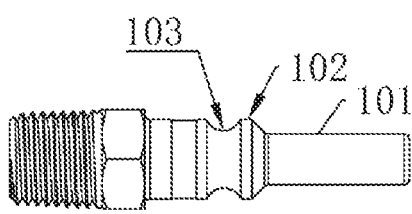
FIG. 6 is a conceptual diagram illustrating a structure of no. 17 American standard plug.
Figure 7:
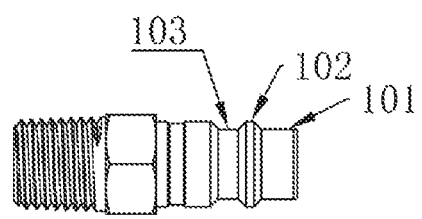
FIG. 7 is a conceptual diagram illustrating a structure of no. 19 American standard plug.

The basic structure and operating principle of embodiment 2 is the same as that of embodiment 1. The difference between them is: as shown in FIG. 2, the front end of the first sealing ring 431 is axially provided with an annular extension part 4311, and the annular extension part 4311 is sleeved inside the first annular step surface 45. The outer diameter of the annular extension part 4311 matches the diameter of the first annular step surface 45, and the inner diameter of the annular extension part 4311 is equal to the inner diameter of the first sealing ring 431.

When connecting no. 3 or no. 6 plug with the quick connector, the columnar insertion section 101 of the plug is inserted into the connector valve core 4, and the end portion of the columnar insertion section 101 abuts against the annular step 47, thereby pushing the connector valve core 4 to move backwards relative to the connector hub 2. Thus, the steel balls 5 are clamped into the clamping groove 103 of the plug. In the aforesaid two assembled states, the connector valve core 4 is in sealing contact with the outer wall of the columnar insertion section 101 of no. 3 or no. 6 plug through the inner wall of the first sealing ring 431 and the inner wall of the annular extension part 4311. In this way, an ideal sealing connection effect is achieved.

When connecting no. 5 or no. 19 plug with the quick connector of the present disclosure, the end portion of the columnar insertion section 101 abuts against the front-end surface of annular extension part 4311 of the first sealing ring 431, thereby pushing the connector valve core 4 to move backwards relative to the connector hub 2. Thus, the steel balls 5 are clamped into the clamping groove 103 of the plug. In the aforesaid two assembled states, the connector valve core 4 is in sealing contact with end surface of no. 5 or no. 19 plug through the front-end surface of the annular extension part 4311. In this way, an ideal sealing connection effect is achieved.

When connecting no. 17 plug with the quick connector of the present disclosure, the connection and sealing methods are the same as that of embodiment 1, which are briefly described herein.

In this embodiment, by means of the annular extension part 4311 arranged at the front end of the first sealing ring 431, when the quick connector is connected with different plugs, the sealing performance may be significantly enhanced. Meanwhile, when no. 3 and no. 6 plugs are used in a high-pressure fluid environment (typically 300PSI), through the arrangement of the annular extension part 4311, the first sealing ring 431 may be prevented from falling off when the plug is pulled out from the quick connector of the present disclosure. Thus, the reliable use of the quick connector is ensured.

The above are merely preferred embodiments of the present disclosure, and thus any equivalent alterations or modifications made according to the structure, features and principles described in the scope of the present disclosure are included in the scope of the present disclosure.

What is claimed is:

1. A universal quick connector, comprising:
a bolt body,
a connector hub,
a hub outer sleeve, and
a connector valve core, wherein the rear end of the connector hub is in threaded connection with the front end of the bolt body, a plurality of ball grooves are uniformly distributed in the side wall of the front end of the connector hub along the circumferential direction, and steel balls are arranged in the ball grooves, wherein the hub outer sleeve is movably sleeved outside the connector hub, and the inner wall of the front end of the hub outer sleeve abuts against the steel balls, wherein an outer sleeve spring is abutted between the hub outer sleeve and the bolt body, and the connector valve core is configured to be a hollow structure with an open front end and a closed rear end, wherein the connector valve core is movably arranged in the connector hub, and the inner wall of the bolt body is provided with a guiding sleeve in sealing fit with the connector valve core, wherein a valve core outer spring is abutted between the front end of the connector valve core and the guiding sleeve, and the side wall of the rear end of the connector valve core is provided with an exhaust port, wherein the interior of the rear end of the connector valve core is provided with a valve core inner spring, wherein the inner wall of the front end of the connector valve core is sequentially provided with a first annular groove and a second annular groove from front to back, wherein a first sealing ring is embedded in the first annular groove, a second sealing ring is embedded in the second annular groove, and the inner diameter of the first sealing ring is larger than the inner diameter of the second sealing ring, wherein the front end of the first annular groove is provided with a first annular step surface, and the rear end of the first annular groove is provided with a second annular step surface, wherein the rear end of the first annular step surface extends to the side wall of the first annular groove, and the front end of the second annular step surface extends to the side wall of the first annular groove, wherein the diameter of the first annular step surface is greater than the diameter of the second annular step surface, and an annular step is formed at the rear end of the second annular step surface.

2. The universal quick connector of claim 1, wherein the guiding sleeve is axially abutted between the bolt body and the connector hub.

3. The universal quick connector of claim 1 or 2, wherein the inner wall of the front end of the guiding sleeve is embedded with a guiding sleeve sealing ring which is in sealing fit with the outer wall of the connector valve core.

4. The universal quick connector of claim 1, 2 or 3, wherein a valve core sealing ring in sealing fit with the inner wall of the guiding sleeve is embedded in the outer wall of the rear end of the connector valve core.

5. The universal quick connector of claim 2, wherein a bolt sealing ring is arranged between the guiding sleeve and the bolt body.

6. The universal quick connector of claim 1, wherein the front end of the connector valve core is provided with an annular extension portion which abuts against the steel balls, and the inner diameter of the annular extension portion is greater than or equal to the diameter of the first annular step surface.

7. The universal quick connector of claim 1, wherein the inner wall of the front end of the hub outer sleeve is sequentially provided with an outer sleeve cylindrical surface section and an outer sleeve conical surface section which are matched with the steel balls from front to back, wherein the rear end of the outer sleeve cylindrical surface section is connected to the front end of the outer sleeve conical surface section.

8. The universal quick connector of claim 1, wherein the outer wall of the front end of the connector hub is provided with a stopping portion in stopping fit with the hub outer sleeve.

9. The universal quick connector of claim 1, wherein the front end of the first sealing ring is axially provided with an annular extension part, and the annular extension part is sleeved inside the first annular step surface, wherein the outer diameter of the annular extension part matches the diameter of the first annular step surface, and the inner diameter of the annular extension part is equal to the inner diameter of the first sealing ring.

* * * * *